United States Patent [19]

Oquidam

[11] 4,309,982
[45] Jan. 12, 1982

[54] PROCESS AND APPARATUS FOR THE PREPARATION OF HOT WATER FROM SOLAR ENERGY

[75] Inventor: Bernard Oquidam, Jaillans, France

[73] Assignee: Pechiney Ugine Kuhlmann, Paris, France

[21] Appl. No.: 28,648

[22] Filed: Apr. 10, 1979

[30] Foreign Application Priority Data

Apr. 11, 1978 [FR] France .............................. 78 11430

[51] Int. Cl.³ .................... F24J 3/02; E03B 7/10; F24D 3/10
[52] U.S. Cl. .................................. 126/420; 126/421; 126/422; 126/435; 126/437; 137/59; 237/66
[58] Field of Search .............. 126/422, 421, 420, 419, 126/435, 437; 137/59; 138/27, 28; 237/66; 417/540

[56] References Cited

U.S. PATENT DOCUMENTS

| 4,013,221 | 3/1977  | Eder .................... 237/66 X |
| 4,044,949 | 8/1977  | Morawetz et al. ........... 126/422 |
| 4,108,160 | 8/1978  | Harper ................... 126/420 |
| 4,116,222 | 9/1978  | Seifried ............... 126/435 X |
| 4,126,122 | 11/1978 | Bross .................... 122/422 |
| 4,138,996 | 2/1979  | Cartland ............... 137/59 X |
| 4,191,166 | 3/1980  | Saarem et al. .......... 137/59 X |

FOREIGN PATENT DOCUMENTS

| 2050354 | 4/1972  | Fed. Rep. of Germany ........ 237/66 |
| 2249691 | 4/1974  | Fed. Rep. of Germany ........ 237/66 |
| 2736456 | 9/1978  | Fed. Rep. of Germany ...... 126/422 |
| 2722451 | 11/1978 | Fed. Rep. of Germany ...... 126/422 |
| 2742304 | 3/1979  | Fed. Rep. of Germany ...... 126/422 |
| 2346649 | 10/1977 | France .................... 126/421 |

Primary Examiner—Samuel Scott
Assistant Examiner—Randall L. Green
Attorney, Agent, or Firm—Dennison, Meserole, Pollack & Scheiner

[57] ABSTRACT

A process for preventing freezing of solar collectors by automatic drainage of the water or liquid working fluid contained within the collectors the working fluid is drained from the collector, but remains within the closed solar collector circuit. Apparatus responsive to the pressure exerted on the collector circuit fluid by an external source of pressurized fluid acts to drain and refill the collectors. The pressure is transmitted through a moving transmissio means, which may be a deformable or movable wall, and which prevents transfer of the collector circuit fluid into the external source of pressurized fluid. The apparatus provides two storage tanks, one of which is provided with an auxiliary heater, the thermal yield being substantially improved by arranging one of the two tanks inside the other.

9 Claims, 6 Drawing Figures

PROCESS AND APPARATUS FOR THE PREPARATION OF HOT WATER FROM SOLAR ENERGY

BACKGROUND OF THE INVENTION

1. Field of the Invention

This invention relates to an improved process for the preparation of hot water from solar energy.

2. Description of the Prior Art

Among the processes for the preparation of hot water from solar energy which have already been described, the one forming the subject of U.S. Pat. No. 4,165,732 is known in particular. That patent describes a process for heating water with storage means comprising two storage tanks, one of which is heated by solar energy and the other by non-solar energy. The description specifies that the heat-carrying fluid used can be water with a glycol additive to eliminate the risks of freezing. Unfortunately, health and safety regulations tend to forbid the use of various commercial antifreeze products such as the glycols owing to the risks of these products mixing with the sanitary water in the event of leakages from the exchanger. The possible use of anhydrous heat-carrying fluids such as the terphenyls also poses problems in the event of leakage and mixing with the sanitary water. In addition the heat transfer properties of these fluids are well below those of water and their viscosity is higher. Obviously, whatever precautions are taken, it is impossible to guarantee that a heat exchanger device be sealed under all circumstances over a period of ten years or more. The possible use of double-walled tubes to produce the exchanger, with an intermediate layer of pure water is an expensive solution which is difficult to bring into practical use.

For all these reasons, the possibility has been investigated of using pure water even in regions where the temperature of the solar collector can fall below 0° C. at night during certain periods of the year. In order to be able to use ordinary water in this way, the present invention generally provides for automating the operations of draining and filling of the solar collector each time that its temperature drops below 0° C. then rises above this temperature again at the end of an undetermined period.

SUMMARY OF THE INVENTION

According to the present invention, a permanently available external source of fluid under pressure can be used to actuate the operations of draining and then refilling of a solar collector. In practice, this external source of fluid under pressure is usually formed by the actual water distributing network, that is to say the one which already supplies the solar heating tank with cold water. However, a different fluid can also be used in certain cases such as, for example, compressed air if an installation guaranteeing the availability of this fluid at a suitable and relatively stable pressure level at any minute is already available. According to the invention, this external source of fluid insures that the water passing through the solar collector is pressurized. The pressure is usually transmitted between the external fluid and the collector circuit in an indirect manner using a moving transmission means which prevents the external fluid from penetrating the collector. This means is usually a deformable wall, a mobile wall or a fluid which is immiscible with the water in the collector and no more miscible with the external fluid. Finally, it is possible to envision the use of a third fluid as moving transmission means such as, for example, air which is separated, on the one hand, from the water in the collector and, on the other hand, from the external fluid by a deformable or movable wall.

A means of detecting the temperature, which is placed on the solar collector or under comparable thermal conditions and is provided with a means of remote control, automatically activates an automatic valve when the temperature of the solar collector falls to the vicinity of 0° C., and this valve causes the water contained in the solar collector to be drained out, usually into a storage container. If the link with the external pressurizing fluid has not already been interrupted, this interruption is made at the same time by the same valve or by a second valve.

When the temperature of the solar collector rises above 0° C., the temperature detecting means causes the closure of the collector draining means and the reopening of the connection with the external pressurizing fluid. This therefore guarantees the refilling of the collector, usually with the same water as it contained initially, which water is driven into the collector from the storage container due to the pressure exerted by the external fluid. If direct pressurization is preferred, the collector is refilled with water originating from the external source. If the pressure of the source of external fluid exceeds too greatly the pressure desired in the solar collector circuit, it is possible to place in the collector circuit a pressure detecting means which controls the closure of the connection with the source of external fluid when this pressure attains a set value.

When the solar collector circuit comprises a circulating pump, the temperature detecting means must preferably keep it stopped at the moment of drainage and allow it to start up again during the refilling operation or, preferably, once the refilling operation is complete. This stoppage and the authorization to start up the circulating pump again can be provided by a pressure detector placed on the solar collector circuit.

In a complementary manner, attempts have been made to improve the performances of solar heating installations. As already mentioned above, in U.S. Pat. No. 4,165,732 use is made of a device comprising two storage tanks, one of which is subjected to solar heating while the other is subjected to non-solar heating. In spite of the attention paid to the insulation of these tanks, their thermal losses and those of their connecting pipes are far from negligible due to the large size of the surfaces for exchange with the external air. This leads both to losses of calories and considerable degradation of the energy which is still stored. This degradation is the main cause of over-consumption of auxiliary non-solar energy which is often very expensive because it is taken at full tariff.

It has been proposed according to another characteristic of the invention that thermal losses be considerably reduced by placing the non-solar heating tank, at least in part, inside the solar heating tank. In this way, the thermal losses of the non-solar heating tank are limited by the temperature gradient between the two tanks and take place to a very great extent to the benefit of the solar tank.

In addition, as will be seen in the examples, the length of the connecting pipes between the two tanks is considerably reduced and, moreover, these pipes can be housed largely inside these tanks.

In a particularly interesting mode of operation, the moving transmission means used to transmit the pressure of the external fluid to the collector circuit can be arranged in the immediate vicinity of the sealed casing of the tank and inside the insulating wall of it. Finally, the wall which separates the tanks will usually comprise an insulating layer. The degradation of the energy stored is thus reduced considerably and this allows recourse to auxiliary energy to be limited to the minimum required.

Finally, the space required by such an extremely compact assembly is less than when the tanks are separated and the volume of the site required for housing it is clearly further reduced in the final analysis.

The methods and structures so provided along with the advantages accruing from a use thereof constitute the objects of the invention, other objects and advantages becoming apparent in light of the following description of the preferred embodiments of the invention.

DESCRIPTION OF THE PREFERRED EMBODIMENT

Figure 1:
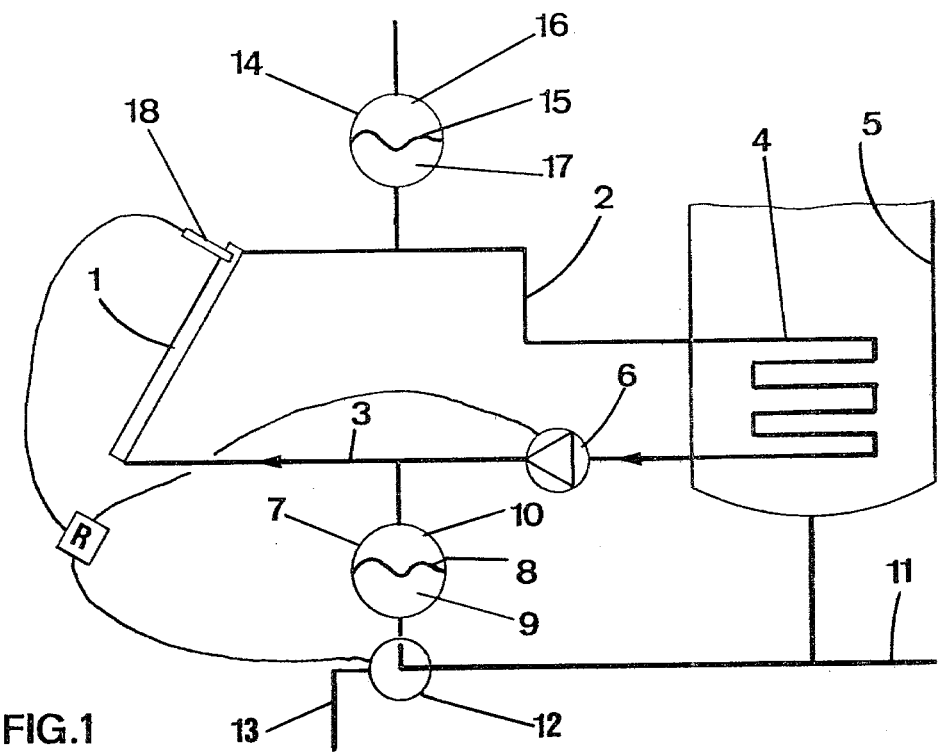
FIG. 1 is a diagram of an automatic draining and filling system for a solar collector circuit in which pressurization is obtained by the indirect action of the water supply.

Referring now to FIG. 1, a solar collector 1 is connected via pipes 2 and 3 to an exchanger 4 placed inside tank 5, only the lower zone of which is illustrated. A circulating pump 6 moves the water through the circuit thus formed in the direction of the arrow and thus produces transfer of heat. A storage container 7 comprises an elastic membrane 8 which separates the container 7 into two sections 9 and 10. The section 9 is connected to water supply pipe 11 via a three-way valve 12. The valve 12 is also connected to an outlet pipe 13. The section 10 of the container 7 is connected to the pipe 3. In the upper zone of the collector circuit, an expansion chamber 14 is also divided into two sections 16 and 17 by an elastic membrane 15. The upper section 16 communicates with the ambient air while the lower section 17 is connected to the pipe 2 and contains a certain amount of dry gas such as air or nitrogen. The volume of the container 7 and the characteristics of the membrane 8 are determined in such a way that when the section 9 is emptied of its contents by evacuation through the pipe 13, the section 10 can receive all the water contained in the collector circuit or, at a minimum, the quantity of water present in the zones which are exposed to frost. Finally, a thermometer 18 is placed on the collector. This thermometer activates a relay R in known manner when the temperature drops to the vicinity of 0° C. The relay acts on the valve 12 in order to close the water inlet via pipe 11 and to connect the section 9 of the container 7 to the outlet 13. At this moment, the membrane drops and the section 10 of the vessel receives the water from the collector circuit. At the same time, the relay R prevents the pump 6 from operating.

When the temperature of the collector rises above 0° C. again, the thermometer 18 controls, via the relay R, the valve 12 which is brought back to its initial position.

The water supply which enters via the pipe 11 refills the lower section 9 of the vessel 7, pushing away the membrane 8. The membrane 8 in turn expels the water contained in the section 10 which fills the collector circuit again. The excess water is pushed toward the expansion chamber 14 until the pressure of the water supply is balanced. The relatively simple device so described has the advantage of preventing the water supply from being mixed with the water in the circuit, thereby eliminating the risk of scaling and of corrosion in the collecting circuit. The container 7 must obviously be correctly insulated to avoid the risk of freezing. The circulating pump 6 is controlled in a known manner by a control system (not described) which starts the pump up only when the energy collected is sufficient to heat the tank.

For simplification, the membrane 15 of the expansion chamber 14 can be omitted and the circuit can therefore be placed in direct communication with the ambient air at its upper section. Finally, a device as described can be applied to any direct or indirect solar heating system using water for protection against frost. The system can be used not only in a heating system with hot water tanks, but can also be applied to heating installations in residential premises, swimming pools, etc.

Figure 2:
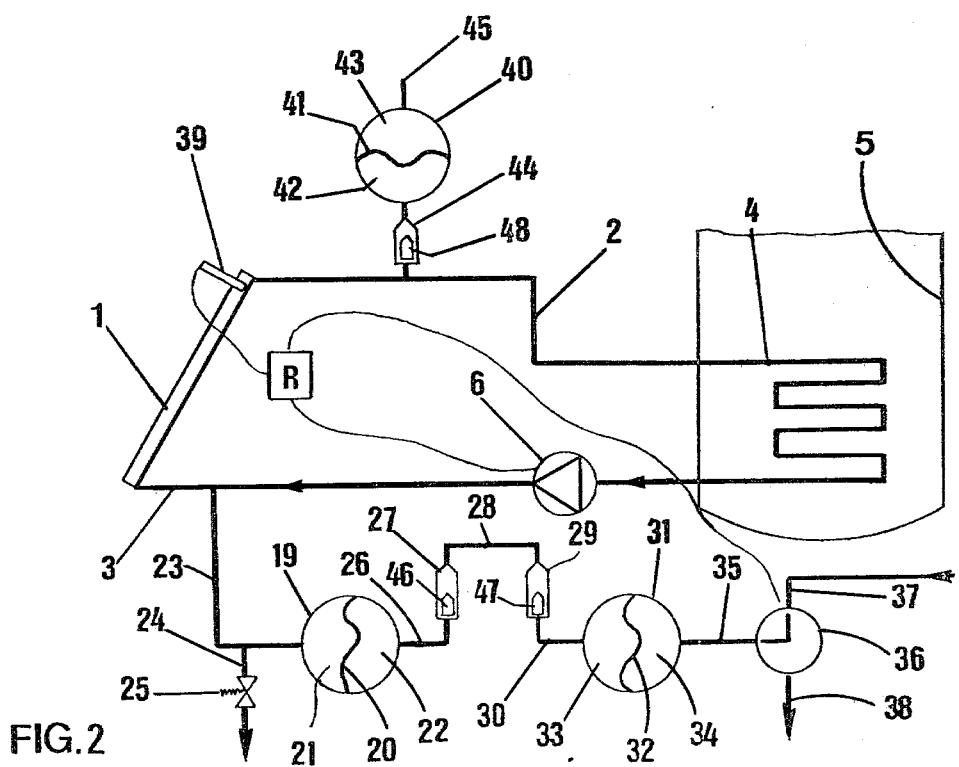
FIG. 2 is a diagram of a system similar to that of FIG. 1 in which a third fluid is used as a moving transmission mechanism.

Referring now to FIG. 2, a system is seen for producing an automatic drainage according to the invention in which one wishes to be able to detect sealing defects which may happen to appear at the level of the deformable or movable wall which transmits pressure between the external fluid and the water in the solar collector circuit.

In this system, the solar collector 1 is connected in the same way as in FIG. 1 via the pipes 2 and 3 to the exchanger 4 placed inside the tank 5. The circulating pump 6 entrains the water contained in the collecting circuit in the direction of the arrow. A storage container 19 located at a level lower than the lowest point of the collecting circuit comprises an elastic membrane 20 which divides the container 19 into two sections 21 and 22. Section 21 is connected via a pipe 23 to the pipe 3. A pipe 24 provided with a valve 25 allows the circuit to be drained if necessary. A container 31 is alwo divided into two sections 33 and 34 by an elastic membrane 32. The section 33 is connected to the pipe 30, while the section 34 is connected via the pipe 35 to an automatic three-way valve 36 also connected to the water supply pipe 37 and to the drainage pipe 38. The sections 22 and 33 of the containers 19 and 31 are filled with air and interconnected by pipes 26-28-30 on which are respectively placed two floating valve devices 27 and 29. The air acts as a third fluid which, in cooperation with the membranes 20 and 32, behaves as a moving means for transmitting the pressure from the water supply pipe to the water in the collector circuit. The volume of the container 19 and the characteristics of the membrane 20 as well as the volume of the container 31 and the characteristics of the membrane 32 are determined so that when the section 34 of the container 31 is emptied of its water content via the pipe 35 the valve 36 and the drainage pipe 38, the section 21 of the container 19 receives all the water contained in the solar collecting circuit due to the drop in the air pressure in the section 22 of the same container. On the other hand, when the section 34 of the container 31 is connected to the water supply pipe 37 by means of the valve 36, the pressure of this water supply pushes the air out of the section 33 of the container 31 toward the section 22 of the container 19 and causes the water contained in the section 21 of the container 19 to be pushed back toward the collecting circuit which it fills again.

The system of FIG. 2 is activated in the same manner as is the system of FIG. 1. A thermometer 39 placed on the solar collector causes the drainage of the water contained in the section 34 of the container 31 via a relay R and of the valve 36 when the temperature drops to the vicinity of 0° C. As we have just seen, this drainage causes the water to flow out of the collecting circuit into the section 21 of the container 19. When the temperature rises above 0° C., the same thermometer connects the section 34 to the water supply pipe 37, and the filling of the section 34 causes air to be pushed into the section 22 and the water contained in the section 21 to be pushed into the solar collecting circuit. An expansion chamber 40 which is also divided into two sections 42 and 43 by an elastic membrane 41 is arranged at the upper part of this circuit. Section 42 is connected to the upper section of the solar collecting circuit by means of a floating valve device 44. The section 43 communicates with the external air via the pipe 45.

The three floating valve devices 27-29-44 comprise valves 46-47-48 which are lighter than water and which, in the absence of water, are located at the lower section of the vertical tube containing them. The clearance between the valves and the walls of the tube is sufficient for the air to circulate freely. When the water penetrates the lower section of one of these devices, the corresponding valve is raised and rises in the tube containing it until it rests against a bearing arranged in the top of the tube and thus blocks the outlet orifice which is of a smaller diameter than the valve. Consequently if one of the two membranes 20 or 32 is accidentally pierced, the water flowing through it will not go beyond the corresponding floating valve device 27 or 29. Similarly, when the collecting circuit is completely filled, the water cannot get farther than the floating valve device 44. In addition, a device for detecting the level of the valve, which allows its upward movement to be detected and a signal to be activated can be placed on each of the devices 27 and 29. Similarly, a level detector placed on the device 44 can allow the valve 36 to be activated and to be placed in the closure position to interrupt filling. This mode of operation allows high reliability of operation to be guaranteed. Instead of using air as a third fluid, a different gas such as nitrogen, for example, can also be used. The floating valve devices can also be replaced by other equivalent devices which allow the gases to pass and oppose the passage of the water.

Figure 3:
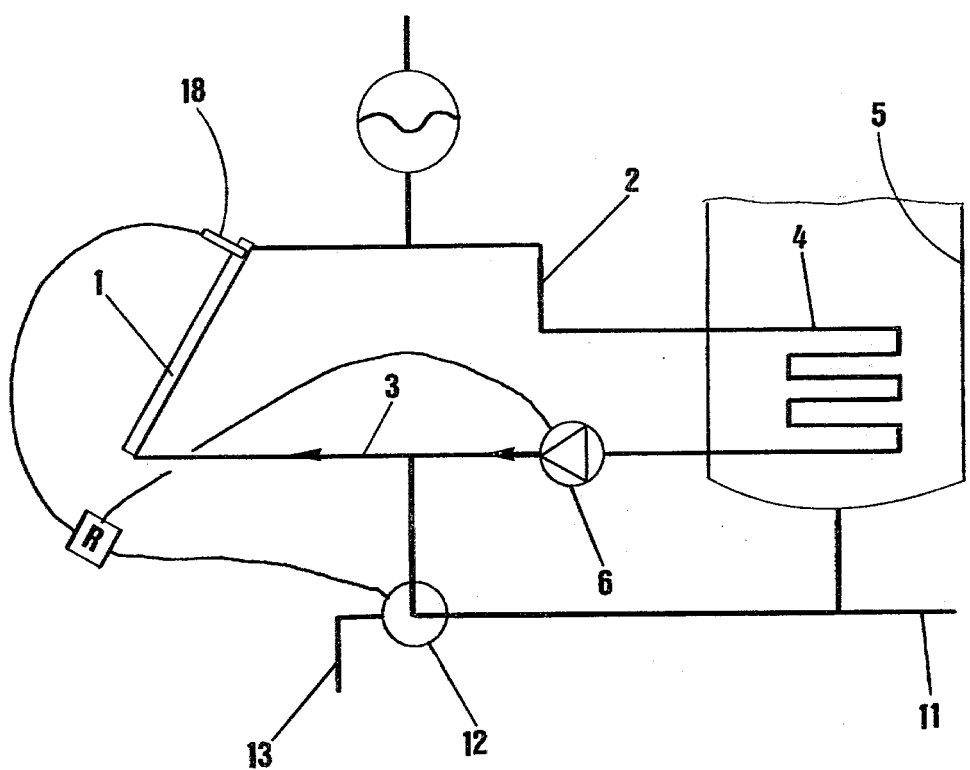
FIG. 3 is a diagram of a system according to the invention in which the water supply causes pressurization in a direct way.

It is possible to simplify the systems described in the two preceding examples in a very substantial way by omitting the container 7 in the diagram in FIG. 1 and by connecting the pipe 11 to the pipe 3 of the collecting circuit by means of the three-way valve 12, as shown in FIG. 3. In this case, the operation of the device is unchanged but it is observed that the collecting water circuit is no longer separated from the water supply circuit. When the temperature of the collector falls to the vicinity of 0° C., the valve 12 shuts off the water inlet via the pipe 11 but connects the circuit of the collector directly to the outlet 13, the water which was contained in this circuit being no longer recovered. When the temperature of the collector rises above 0° C., the return of the valve 12 to its starting position ensures that the collector circuit is refilled with a fresh amount of the water supply. One can imagine that if this water contains lime, and if operation is repeated frequently, there would be a risk of the pipes becoming scaled. To prevent this, the water supply could be treated in a known manner to eliminate the undesirable ions which it contains.

Figure 4:
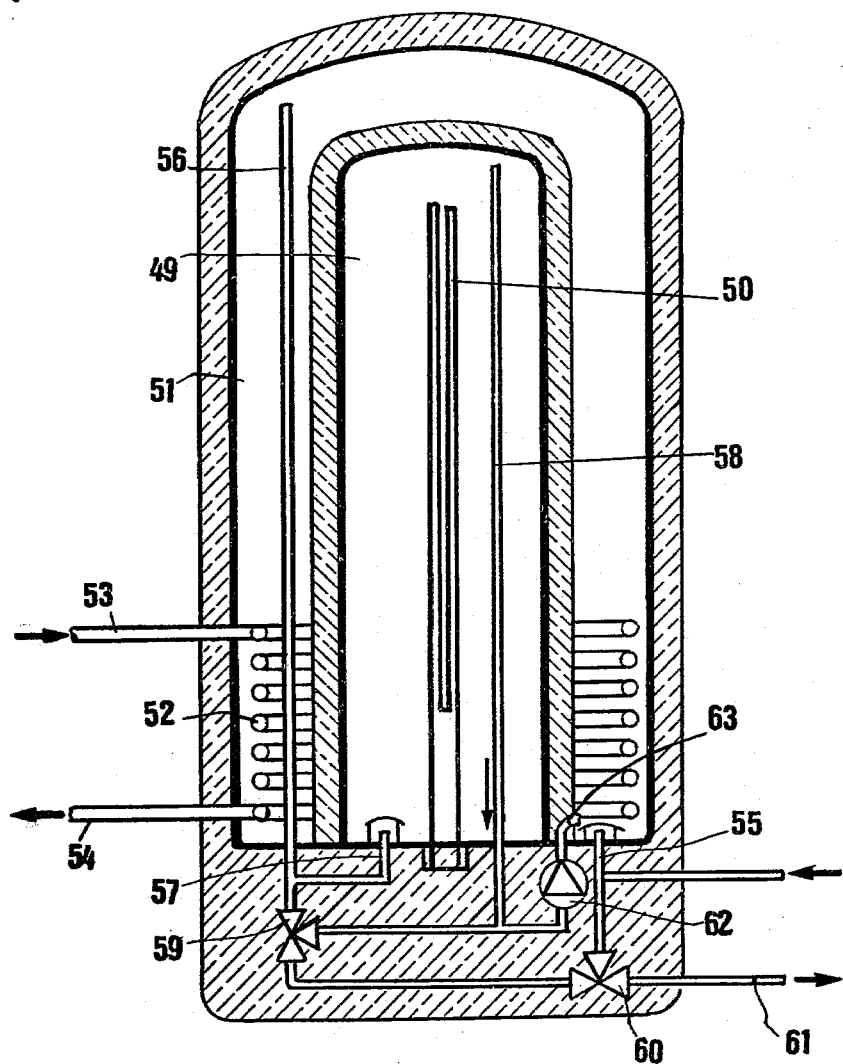
FIG. 4 is a partial diagram of a heating installation with two tanks in which the non-solar heating tank is placed inside the solar heating tank.

FIG. 4 provides an embodiment of an additional improvement which can advantageously be made to solar heating installations comprising two tanks. As defined above, this improvement involves connecting two tanks to each other so that a certain surface area of the wall is shared.

The device of FIG. 4 comprises an internal tank 49 which is heated by an electric resistance 50 and is completely encased by an external tank 51 heated by a solar exchanger formed by a tubular coil 52 inside which the water circulates. This coil is connected via pipes 53 and 54 to a solar collector of a known type (not shown). A device of this type is produced in a known manner, the cold water supply being typically introduced via the pipe 55 at the base of the tank 51 in which it is previously heated by the solar-driven element 52. The heated water which is removed from the upper part of the tank 51, via the pipe 56, is introduced at the base of the tank 49, via the connecting pipe 57. The pipe 56 is immersed in the tank 51 over almost its entire length, thereby eliminating thermal losses. This arrangement of the two heating tanks allows thermal losses to be reduced to a considerable extent. Thus, with two tanks of the same capacity, each having a cylindrical shape with a height to diameter ratio of 2, a calculation demonstrates that the external surface in the case of the device in FIG. 3 is only about 1.5 times the surface area of each of the tanks when they are separate.

Figure 5:
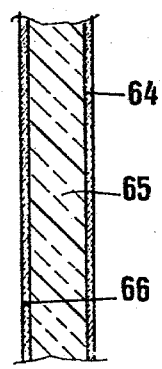
FIG. 5 is a detail view from FIG. 4, illustrating the structure of the wall placed between the two tanks; and, FIG. 6 is an elevational view in section of an automatic drainage device attached to the lower part of a solar heating tank.

The thermal losses through the walls are reduced to a greater extent than that expected from the reduction in the external surface because the average temperature gradient through the walls of the tank 51 is relatively low. The wall of the tank 49 which is shared with the tank 51 comprises insulation, as shown in more detail in FIG. 5. This wall has a sandwich structure formed by an insulating layer of plastic foam 65 contained between two envelopes of sheet steel 64 and 66. The thickness of these different constituents of the sandwich is calculated in a manner known to the skilled man as a function of the stresses to be withstood and the desired rates of heat transfer. A pipe 58 connects the top of the tank 49 to the circulating pump 62, then, via the connecting pipe 63, to the base of the tank 51 so as to produce certain embodiments of a device with two tanks. It is seen that the circulating pump 62 is isolated by the insulation of the tank while the majority of the pipe 58 is inside the tank 49.

The hot water intended for the consumer circuit is taken from the upper zone of the tank 49, also by means of the pipe 58. According to an embodiment already described and claimed in the aforementioned U.S. Patent, a thermostatic mixer 59 allows a variable proportion of water leaving the tank 51 to be added to the water leaving the tank 49 as a function of the desired temperature for use. A second thermostatic mixer 60 allows cold water originating from the supply circuit to be added so as to reduce if necessary the temperature of the water, taken, towards the consumer circuit, via the pipe 61, below the temperature level of the water in the least hot tank.

Figure 6:
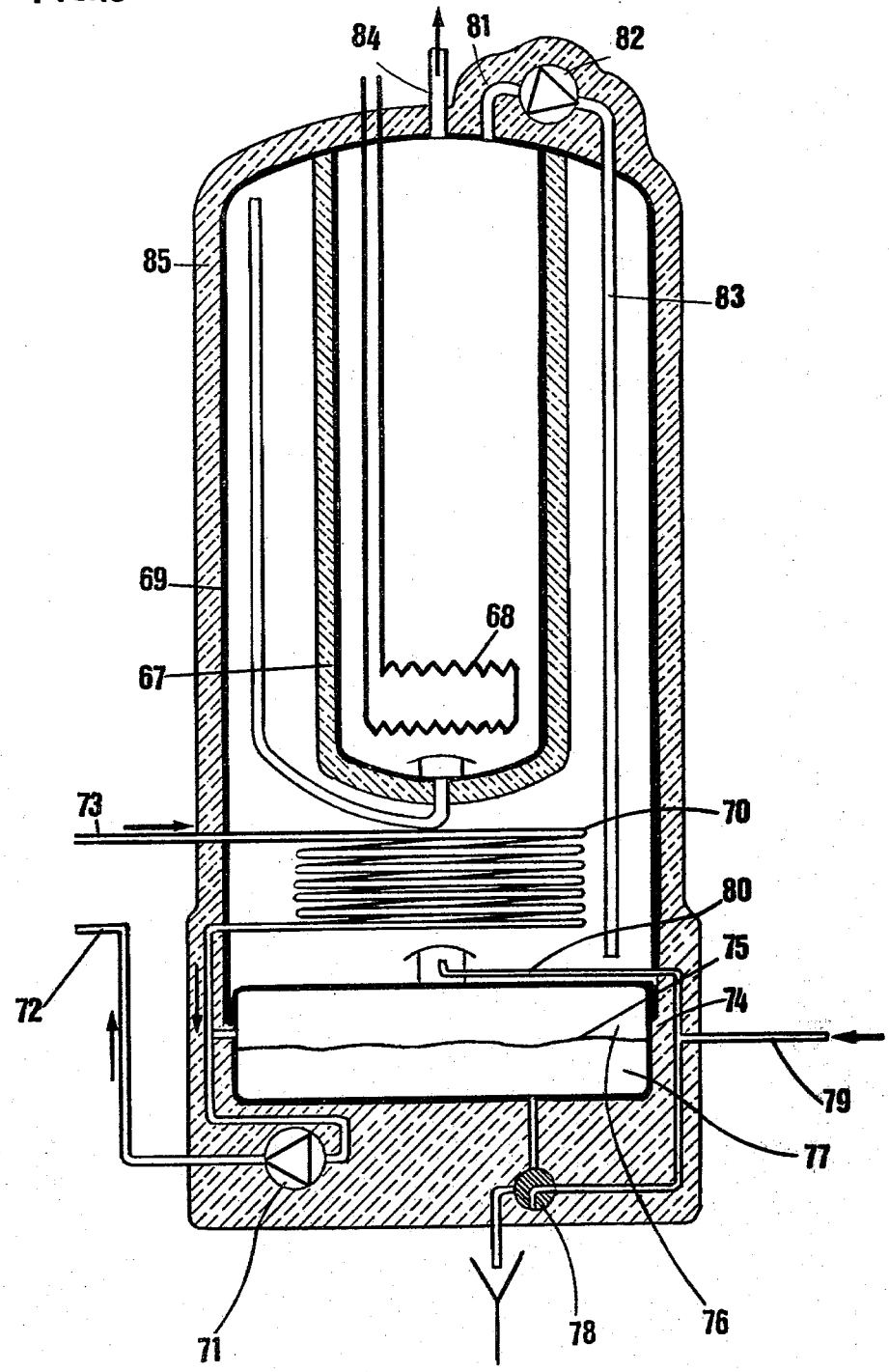

In the event of frost, it is often worth placing the storage container of the drainage device in the immediate vicinity of the storage tanks so as to simplify the structure, and also to avoid any risk of this container freezing. FIG. 6 illustrates a solar heating device with two tanks in which a non-solar heating tank 67 is arranged inside a solar heating tank 69, the two tanks being joined by their common upper end. The tank 67 is heated by an electric resistance 68, while the tank 69 is heated by an exchanger 70 connected to a solar collector (not shown) via pipes 72 and 73. A circulating pump 71 placed on the pipe 72 causes the water to circulate in a closed circuit between exchanger and collector. The storage container 74 includes an elastic membrane 75 which separates it into two sections 76 and 77. The section 76 is connected to the pipe 72 between the outlet of the exchanger and the pump. The section 77 is connected via a three-way valve 78, on the one hand, to the cold water supply pipe 79 and, on the other hand, to a drainage pipe.

The solar tank is supplied with cold water by means of the pipe 80 which is in turn connected to the pipe 79. The other devices are similar to those described in the previous example. The circulating pump 82 receives via pipe 81 the water originating from the tank 67, and sends it via the pipe 83 to the base of the tank 69 when it is necessary to do this in order to produce the embodiment described in the aforesaid U.S. Pat. No. 4,165,732. The hot water is taken toward the consumer circuit by the pipe 84. This hot water can be mixed using a device which is comparable to the one described relative to FIG. 3 with water originating from the tank 69 so as to reduce its temperature, if necessary.

It is seen that the storage container 74 is attached to the base of the tank 69, from which it is separated only by a metallic wall. The assembly is covered by a continuous layer of insulation which also covers the circulating pump 71 of the solar collecting circuit. It is therefore seen that when the remote control device (not shown) directs the valve 78 so as to drain the section 77, the water contained in the solar collector circuit fills the section 76 and is perfectly protected from freezing throughout its entire period of residence therein.

In addition to great reliability in use, this compact arrangement provides substantial positioning facilities which reduce the installation costs. Numerous modifications can be made to the implementation of the process and the devices described without departing from the scope of the invention. Similarly, it is possible to combine the devices described or, in contrast, to use them separately. Thus, the most reliable and the most efficient conditions for use will be united by combining in the same installation the automatic drainage of the collectors and the compact complementary arrangement of the two tanks. In other installations, for reasons of climate or for other reasons, only one of these devices could be used.

I claim:

1. A process for improving the reliability of operation and the yield of water heating installations with the aid of solar energy, which installations comprise at least one solar collector and a heat exchanger which are traversed in a closed circuit by a first fluid, and an external source of pressurized fluid; the improvement comprising:

providing a two-compartment storage container having a moving transmission means separating the compartments, said closed circuit including one said compartment, said external source of pressurized fluid connected to the other said compartment, said external source of pressurized fluid being isolated from communication with said closed circuit;

said moving transmission means when subjected to said pressurized fluid serving to reduce the size of said one compartment, and when not subjected to said pressurized fluid, to enlarge said one compartment;

interrupting the connection of said other compartment to said external source of pressurized fluid when the temperature of said solar collector decreases to the vicinity of the freezing point of said first fluid, to cause said first fluid contained in said closed solar collector circuit to lose pressure and to flow into said one compartment; and, reestablishing the connection between said other compartment and said external source of pressurized fluid when the temperature of said solar collector rises above the freezing point of said first fluid, to cause said solar collector to be refilled due to the pressure of said pressurized fluid acting against said transmission means.

2. A system for protection against freezing of heat transfer fluid in a solar heating system comprising:

a solar collector and a heat exchanger interconnected by a closed circuit containing a first fluid;

an external source of pressurized fluid;

a storage container with at least two compartments and having a moving transmission means separating the compartments, said closed circuit including one said compartment, said external source of pressurized fluid being connected to another of said compartments and being isolated from communication with said closed circuit;

remote control valve means interposed between said external source of pressurized fluid and the said other said compartment and adapted to permit drainage of pressurized fluid from said other compartment as well as to allow flow of said pressurized fluid into said other compartment; and temperature sensing means adjacent said solar collector and exposed to the external atmosphere and connected to said remote control valve means for actuating the same to drain pressurized fluid from said other compartment when the sensed temperature approaches the freezing point of the first fluid, whereby said moving transmission means will move to increase the capacity of the one said compartment to receive therein all of the fluid in the closed circuit, and to actuate the valve means when the sensed temperature is at a safe operating level to admit pressurized fluid into the other said compartment, displacing said moving transmission means to force some of the first fluid from said one compartment back into the closed circuit, filling the same.

3. A system according to claim 2, wherein said moving transmission means comprises a deformable or movable wall.

4. A system according to claim 2, wherein said storage container comprises a housing having a deformable or movable wall defining the said moving transmission means which spans the housing interior dividing it into two compartments, the one said compartment being in fluid communication with the closed circuit, said pressurized fluid being adapted to enter directly into the other said compartment.

5. A system according to claim 2 wherein said storage container includes two separate reservoirs each having a movable or deformable wall dividing the reservoirs into two compartments, one compartment of the first reservoir being in fluid communication with the closed circuit, one compartment of the second reservoir being in communication with the source of pressurized fluid, and the remaining compartments being interconnected in a closed circuit and filled with a third fluid; whereby movement of the dividing wall in the second reservoir by the pressurized fluid being transmitted to the wall of the first reservoir by the third fluid.

6. A system according to claim 5, wherein said first fluid contained in the closed circuit between the solar collector and the heat exchanger is a liquid and said third fluid is a gas and further comprising; floating valve means operatively connected into the closed circuit which is filled with the third fluid said valve means allowing passage of gas but not liquid.

7. A system according to claim 2 and further including an insulated housing, said storage container being located within said housing.

8. A system according to claim 7 and further including a main tank for the medium to be heated, said heat exchanger located within said tank, a separate tank within said main tank and in fluid communication therewith, and non-solar heating means in said separate tank.

9. A system according to claim 8, further comprising:
a first pump for circulating said first fluid from said solar collector through said heat exchanger; and
a second pump for circulating the medium to be heated between said separate tank and said main tank; said first pump and said second pump being arranged within said insulated housing.

* * * * *